US008757193B2

(12) United States Patent
Lauderdale

(10) Patent No.: US 8,757,193 B2
(45) Date of Patent: Jun. 24, 2014

(54) CONTROL LINE REDUCING HYDRAULIC CONTROL SYSTEM AND CONTROL VALVE THEREFOR

(75) Inventor: Donald P. Lauderdale, Cypress, TX (US)

(73) Assignee: Baker Hughes Incorporated, Houston, TX (US)

( * ) Notice: Subject to any disclaimer, the term of this patent is extended or adjusted under 35 U.S.C. 154(b) by 946 days.

(21) Appl. No.: 11/781,523

(22) Filed: Jul. 23, 2007

(65) Prior Publication Data

US 2008/0029163 A1 Feb. 7, 2008

Related U.S. Application Data

(60) Provisional application No. 60/836,022, filed on Aug. 7, 2006.

(51) Int. Cl.
*G05D 7/03* (2006.01)

(52) U.S. Cl.
USPC .................. 137/119.03; 137/119.08; 166/375

(58) Field of Classification Search
USPC ............. 137/118.01, 119.01, 119.03, 119.08; 166/374, 375
See application file for complete search history.

(56) References Cited

U.S. PATENT DOCUMENTS

| | | | | |
|---|---|---|---|---|
| 2,395,150 | A * | 2/1946 | Sloan et al. | 137/119.03 |
| 3,719,196 | A * | 3/1973 | McJones | 137/110 |
| 3,797,740 | A * | 3/1974 | Kah, Jr. | 239/11 |
| 4,249,599 | A | 2/1981 | Krause | |
| 4,637,419 | A | 1/1987 | Hughes | |
| 5,445,182 | A * | 8/1995 | Sturman et al. | 137/119.03 |
| 5,778,918 | A | 7/1998 | McLelland | |
| 5,832,996 | A | 11/1998 | Carmody et al. | |
| 6,567,013 | B1 * | 5/2003 | Purkis et al. | 340/854.3 |
| 2004/0050555 | A1 * | 3/2004 | Rayssiguier et al. | 166/374 |

FOREIGN PATENT DOCUMENTS

| | | | |
|---|---|---|---|
| AU | 539201 | B2 | 9/1984 |
| GB | 2207218 | A | 1/1989 |
| GB | 2377721 | A | 1/2003 |

OTHER PUBLICATIONS

Well Dynamics, Transforming Reservoirs: Intelligent Completion Technology. "Remotely Control and Manage Even the Most Complex Reservoirs" Jan. 30, 2008: Website having 1 page, Data Sheet having 4 pages. Retrieved Online on Jun. 24, 2008 from: http://www.welldynamics.conn/fc_downhole_digital_hydraulics.html.

Baker Oil Tools, "Intelligent Well Systems Product Technical Specification: InForce Single Line Switch." Baker Hughes Incorporated, Product Family H81503: 2008, 10 pages.

(Continued)

*Primary Examiner* — William McCalister
(74) *Attorney, Agent, or Firm* — Cantor Colburn LLP

(57) ABSTRACT

A control valve includes a housing, an inlet port at the housing, a device port at the housing, a valve port at the housing, and a spool disposed at the housing, the spool initially connecting the inlet port to the device port and subsequently to a pressure event connecting the inlet port to the valve port. An actuation system includes a plurality of control valves, each valve being addressable and conditionable to communicate with one of a device and another control valve, and a plurality of devices each in operable communication with one of the plurality of control valves.

4 Claims, 7 Drawing Sheets

(56) References Cited

OTHER PUBLICATIONS

Anderson, A. “Integrating Intelligent Well Systems with Other Completion Technologies.” Technology & Services, Business Briefing: Exploration & Production: The Oil & Gas Review, Mar. 2005. 4 pages. Retrieved online on Jun. 24, 2008 from: http://www.touchbriefings.com/pdf/1195/Baker_tech.pdf.

Morgan, D. “Shell Ups the “Smart Field” Stakes.” Oil Online, Jul. 25, 2005: 4 pages. Retrieved Online on Jun. 24, 2008 from: http://www.oilonline.com/news/features/aog/20050725.Shell_up.18636.asp.

PCT International Search Report, International Application No. PCT/2007/074635, Date Mailed Oct. 23, 2007, Date Filed Jul. 27, 2007.

* cited by examiner

CONTROL LINE REDUCING HYDRAULIC CONTROL SYSTEM AND CONTROL VALVE THEREFOR

CROSS REFERENCE TO RELATED APPLICATIONS

This application claims priority to provisional application 60/836,022 filed Aug. 7, 2006, the entire contents of which are incorporated herein by reference.

BACKGROUND

Hydraulic control of downhole systems has long been a trusted and thus ubiquitous choice of well operators. Hydraulic control lines are relatively small, are simple to operate and very reliably transmit pressure to distant locations where either the existence of pressure is used as a signal or a higher pressure fluid volume is used to actuate a shiftable device downhole.

In older well completions relatively little control was used in the downhole environment and correspondingly few control lines were needed to extend back to the surface. In view of the relatively small number of lines, dealing with them with openings through packers (feed-through packers, etc.) and the like has always been accepted and functional. As wellbore complexity has increased however with an ever-expanding need for control related to improved production quality and quantity, a greater number of flow modifying structures (e.g. valves) and other downhole equipment has been placed downhole to enhance return on investment. With the additional devices downhole comes a requirement to provide a control regime for such devices. While hydraulic control lines are still quite well favored as a control means, the multiplicity of controllable devices causes the number of control lines required with today's technology to exceed the space available to run them. In many typical completions today the number of control lines will equal the number of devices plus 1. With consideration of the possibility of 15000 feet of wellbore having perhaps 40 valves or other controllable devices, it is easily imagined that the needed 41 control lines will have difficulty fitting in the 9⅝ inch annulus around a completion string.

In view of the foregoing, the art would certainly welcome a means for reducing the number of control lines necessary to individually control a multiplicity of devices downhole.

SUMMARY

Disclosed herein is a control valve. The valve includes a housing, an inlet port at the housing, a device port at the housing, a valve port at the housing, and a spool disposed at the housing, the spool initially connecting the inlet port to the device port and subsequently to a pressure event connecting the inlet port to the valve port.

Further disclosed herein is an actuation system. The actuation system includes a plurality of control valves, each valve being addressable and conditionable to communicate with one of a device and another control valve, and a plurality of devices each in operable communication with one of the plurality of control valves.

DETAILED DESCRIPTION

Initially it is pointed out that while described embodiments of the control valve and system hereof may be described in terms of downhole equipment or use, the hydraulic activation system can be applied to any field in which it would be advantageous to control multiple devices with only three control lines.

Figure 1:
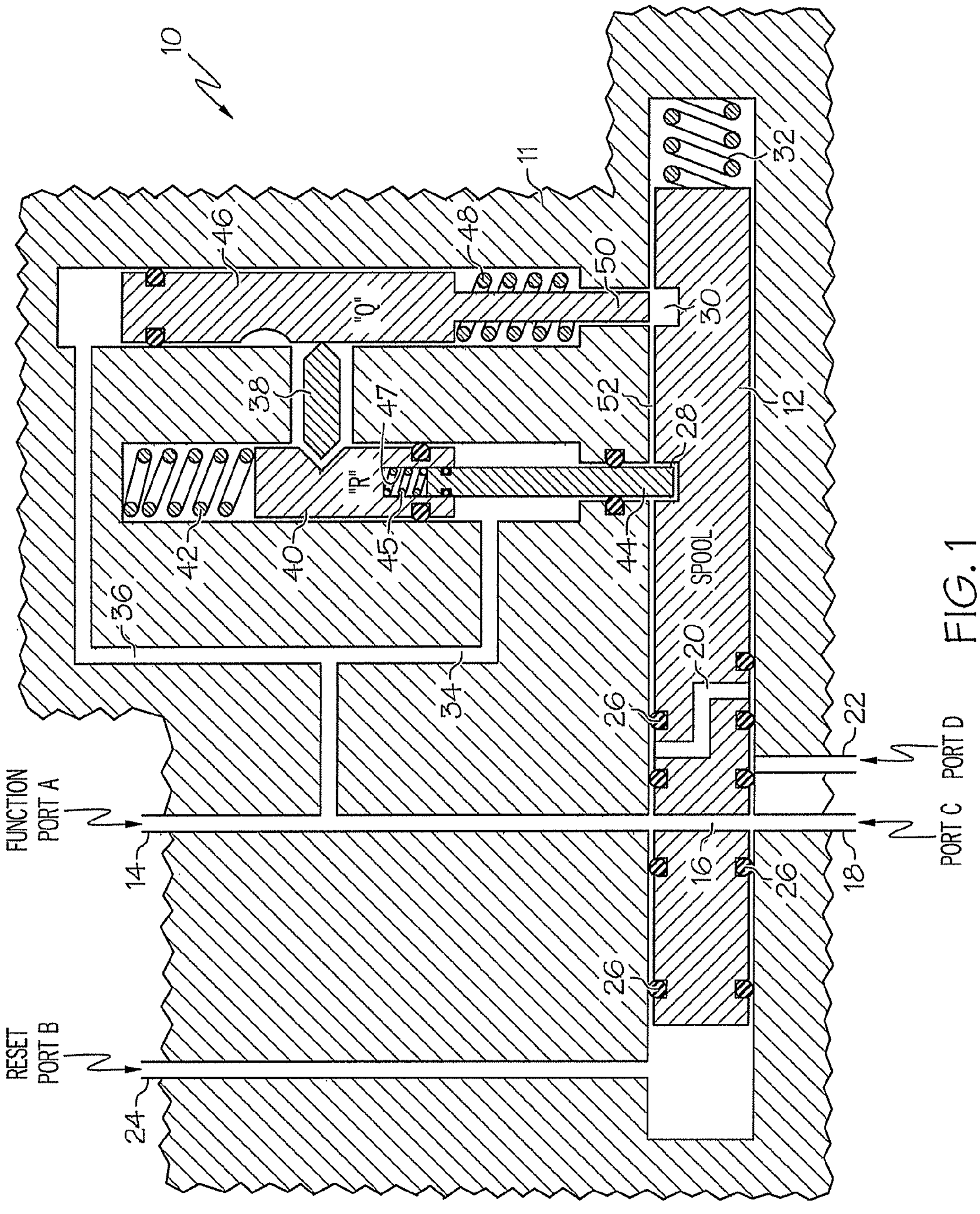
FIG. 1 is a schematic view of an embodiment of a control valve as disclosed herein.

Referring to FIG. 1, a control valve 10 is illustrated schematically. The valve 10 includes a housing 11 supporting a spool 12. Spool 12 is responsive to pressure at an inlet port 14 both in terms of the transmission of hydraulic fluid pressure and in terms of the direct activation of the spool itself. The control valve 10 acts to either provide hydraulic pressure to a device or to pass hydraulic pressure to a next control valve in a series of two or more valves. It is to be understood however that the control valve herein can also be used without a second or other number of valves. A single one of the control valves disclosed herein can be selected for use for any number of applications where a first and a second flow or pressure path is required or desired.

Effectuating the ability of the valve to provide the two communication paths (pressure or flow paths), the spool 12 is cyclable between two positions. Movement from a first position to a second position happens automatically upon a first application and release of pressure to the valve either initially or after a reset and movement from the second position to the first position is achievable by application of pressure to a separate port of the control valve discussed further hereunder. It is to be understood that automatic movement from the first to the second position can occur as already stated and can also occur simultaneously with the second pressure event after initial use or reset for applications where it is desirable that the first communication path be left connected until the second pressure event. Such, for example, may be the case where fine adjustment is desired of the device being actuate and a back flow of fluid therethrough is efficacious of the desired result.

With respect to the illustrated embodiment and more specifically referring to FIG. 1, spool 12 upon a first application of hydraulic fluid pressure from a remote location (not shown) to inlet port 14 will transmit that pressure through spool path 16 to a device port 18. Upon a reduction of pressure at inlet port 14, spool 12 cycles to allow a fluid connection capability therein to provide such connection through a spool path 20 between inlet port 14 and a valve port 22. It is important to note that in this embodiment this cycle occurs only upon a very first pressure and release or after a reset of the control valve 10. Subsequent application of hydraulic pressure from the remote location to inlet port 14 is directed through spool 12 to valve port 22, the spool remaining in this second position until reset by application of pressure to a reset port 24 whereafter the next subsequent pressure event will be transmitted through spool path 16 to device port 18 again. The control valve 10 is selectably positionable between the two positions any number of times simply by selecting which port to pressure-up on from the remote location.

Still referring to FIG. 1, it will be appreciated that the spool 12 includes a plurality of seals 26, which in one embodiment are o-rings as illustrated. Each o-ring is positioned to be located on one side or the other of a fluid flow path to enable the flow paths to hold pressure. One of ordinary skill in the art will appreciate this from the figure. Further included on spool are recesses 28 and 30. The recesses are carefully positioned relative to each other and relative to piston assemblies R and Q so that desired operation of the control valve can be accomplished. Recesses 28 and 30 must be positioned so that once recess 28 becomes disengaged with assembly R, the spool 12, under urging from compression spring 32, moves in the direction depicted on the left of the figure. The spool movement left will be limited by assembly Q but is sufficient to prevent reengagement with assembly R until reset of the control valve 10.

Addressing Assemblies R and Q in detail, each assembly is exposable to pressure at inlet port 14 as illustrated in the figure through R branch 34 and Q branch 36, respectively. It will be appreciated from the figure that the assemblies are pressure actuated at axially different ends. A lock shuttle 38 is disposed between the assemblies R and Q and configured for selective engagement therewith.

Upon application of pressure to inlet 14, branch 34 and branch 36 transmit pressure, and volume to the assemblies R and Q. When pressure is applied to assembly R, piston 40 moves against the bias of spring 42 toward the upper margin of the figure. This movement disengages pin 44 from recess 28. Simultaneously, piston 46 of assembly Q moves toward the bottom margin of the figure against the bias of spring 48 to engage pin 50 with recess 30. It is to be appreciated that the spring rates between spring 42 and spring 48 are different. Spring 48 is of a lesser spring rate to ensure that the pin 50 engages recess 30 prior to pin 44 releasing recess 28. This, as is apparent from the foregoing discussion and drawing figure is necessary to prevent the spool 12 moving to the second position prematurely. As was noted earlier, the positioning of recesses 28 and 30, prevent the reengagement of pin 44 with recess 28 once released from recess 28 (until reset). The shuttle 38 automatically moves into assembly Q upon the simultaneous movement of the assemblies and is locked there. Shuttle 38 remains locked in assembly Q until pressure is bled from branches 34 and 36. In order for the shuttle to unlock from assembly Q, assembly R must move to a position where the shuttle can move thereinto. This occurs when the pin 44 rests on an outside surface 52 of spool 12, which readies the spool 12 for its shift to the second position under the impetus of spring 32. As soon as the pin 44 reaches the outside surface 52 the pin 44 itself is urged against a spring 45 within a cavity 47 of piston 40, the shuttle is moveable into assembly R thereby releasing assembly Q. Because assembly Q is biased by spring 48, assembly Q moves to a position of disengagement with recess 30. Once pin 50 is disengaged with recess 30, and recalling that pin 44 is resting on surface 52 as opposed to being engaged with recess 28, the spool is free to move leftwardly in the figure in order to position the spool in the second position. Resetting of the control valve requires pressure at reset port 24 which urges spool 12 against the spring 32 until pin 44 reengages recess 28 under the bias of spring 42. It will be appreciated that the engagement of shuttle 38 with piston 40 is a loose fit to allow piston 40 and pin 44 to move into engagement with recess 28 even when engaged with shuttle 38.

The control valve(s) 10 as described above enable hydraulic actuation and control of from one to many downhole devices while requiring only three control lines (illustrated as A, B and C in the drawings hereof) in any given position of the system and a number of control valves equal to the number of devices. The control valves may be a part of the devices themselves or separate therefrom as desired.

DETAILED DESCRIPTION

Figure 2:
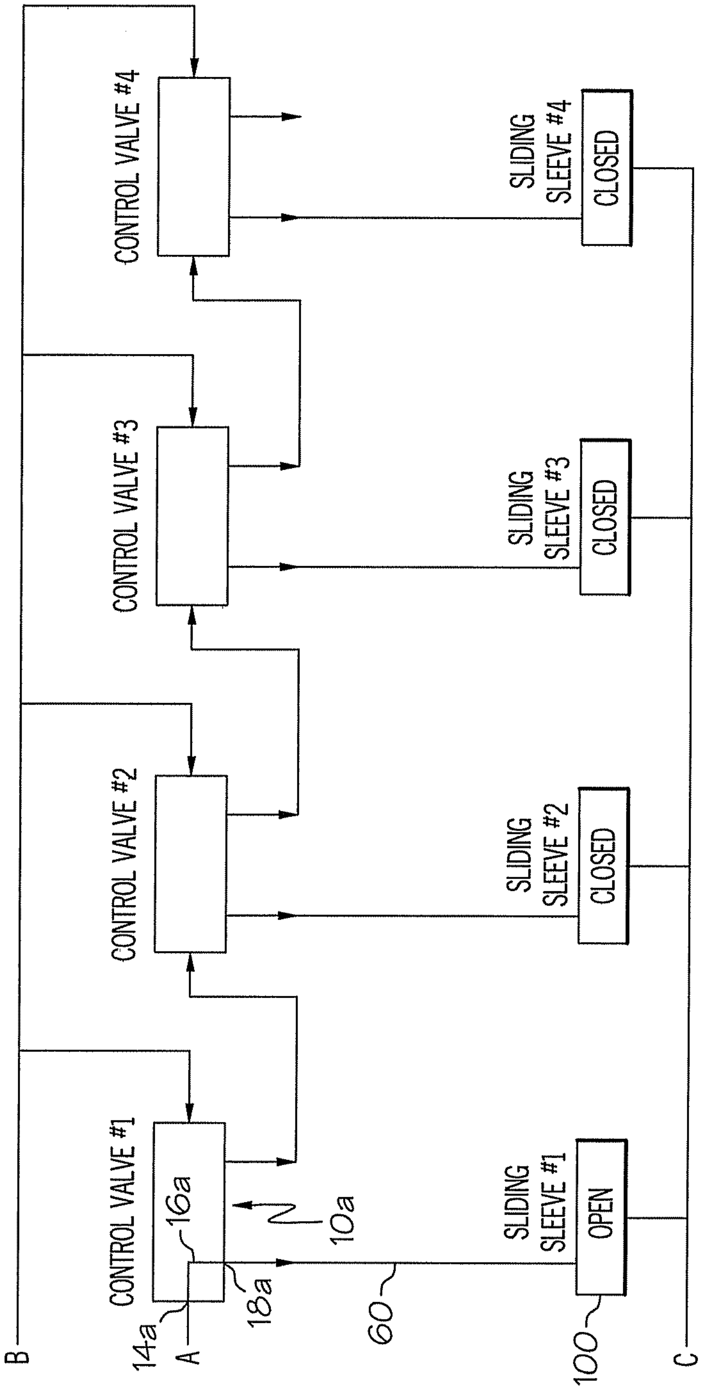
FIG. 2 is a schematic illustration of four control valves and four hydraulically actuatable devices representing an embodiment of a hydraulic control system.

Referring now to FIGS. 2-7 one embodiment of the hydraulic activation system is illustrated in various positions as pressure is cycled to effectively present to the reader the functionality of the system. In FIG. 2, a first control valve 10 is in a position whereby hydraulic fluid pressure applied through control line A to port 14*a* is sent through spool path 16*a* device port 18*a* and from there through flow indicator 60 to a device 100. The pressure up event may be used to activate device 100 or may alternatively be used solely to cycle valve 10*a*. In the illustration, the device 100 is actuated to the open position. Whether or not device 100 is activated, valve 10*a* will cycle from the first position wherein inlet port 14*a* is connected to device port 18*a* to the second position wherein inlet port 14*a* is connected to valve port 22*a*. If it is desired that this pressure up event activates device 100, then control line C is to be open to a pressure lower than that applied to line A. If alternatively device 100 is not intended to be activated by the particular pressure up event at line A, then line C is to be capped or otherwise maintained at a pressure equal to that at line A to thereby hydraulically lock device 100 preventing activation thereof.

Following the first pressure up and release of line A, control valve 10 automatically shifts to the second position. This is illustrated schematically in FIG. 3 where spool path 20*a* is illustrated connecting inlet port 14*a* to valve port 22*a*. Another flow indicator 62 illustrates the fluid path then provided from valve port 22*a* to inlet port 14*b* in control valve 10*b*.

Identically to the action just described in control valve 10*a*, control valve 10*b* is activated initially (or after reset) by a first pressure up of indicator 62. It will be understood that as first use of the entire system, or after reset, which occurs in all control valves simultaneously, pressure at inlet port 14*b* is achieved only by pressuring up twice on line A. Indeed the number of pressure events to activate a particular control valve at initial use or after reset is equal to the number of control valves preceding the target valve plus one. Likewise, the first pressure up event experienced by each valve will result in pressure at device port 16 while a second or subsequent pressure event experienced as each valve will be transmitted to valve port 22 and thus to the next valve in a series of valves. A series of valves may be as long as desired without detrimental effect until frictional forces incurred by the actuating fluid build to a degree that pressure change becomes insufficient to operate devices or cycle the control valves. With the use of a common ¼ inch control line and the control valves as configured in FIG. 1, it is axiomatic that a great number of valves may be used before friction imposes restriction as noted.

Figure 3:
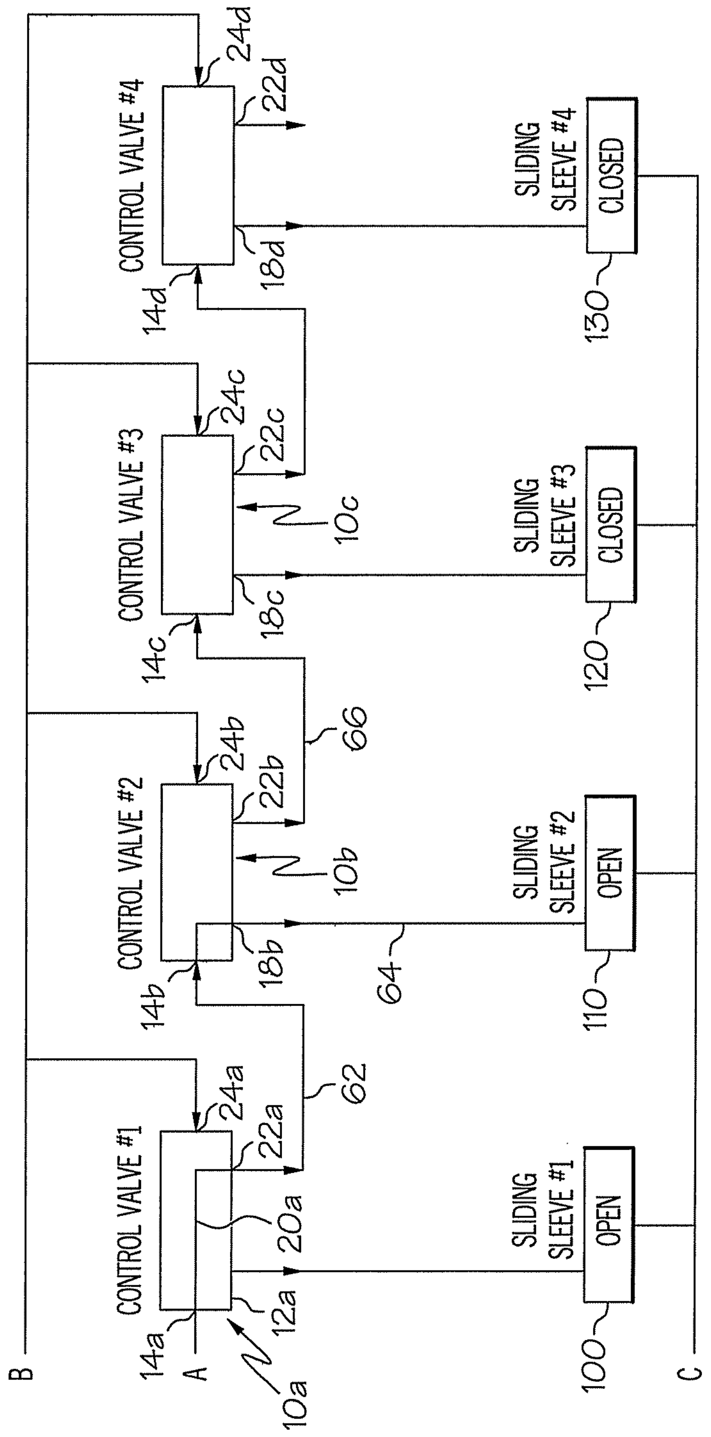
FIG. 3 is the illustration of FIG. 2 in a different position.

When addressing control valve 10*b* as illustrated in FIG. 3, activation or not of device 110 (illustrated as actuated open in the figure) is achievable through flow indicator 64 similarly to activation or not of device 110 as noted above.

Figure 4:
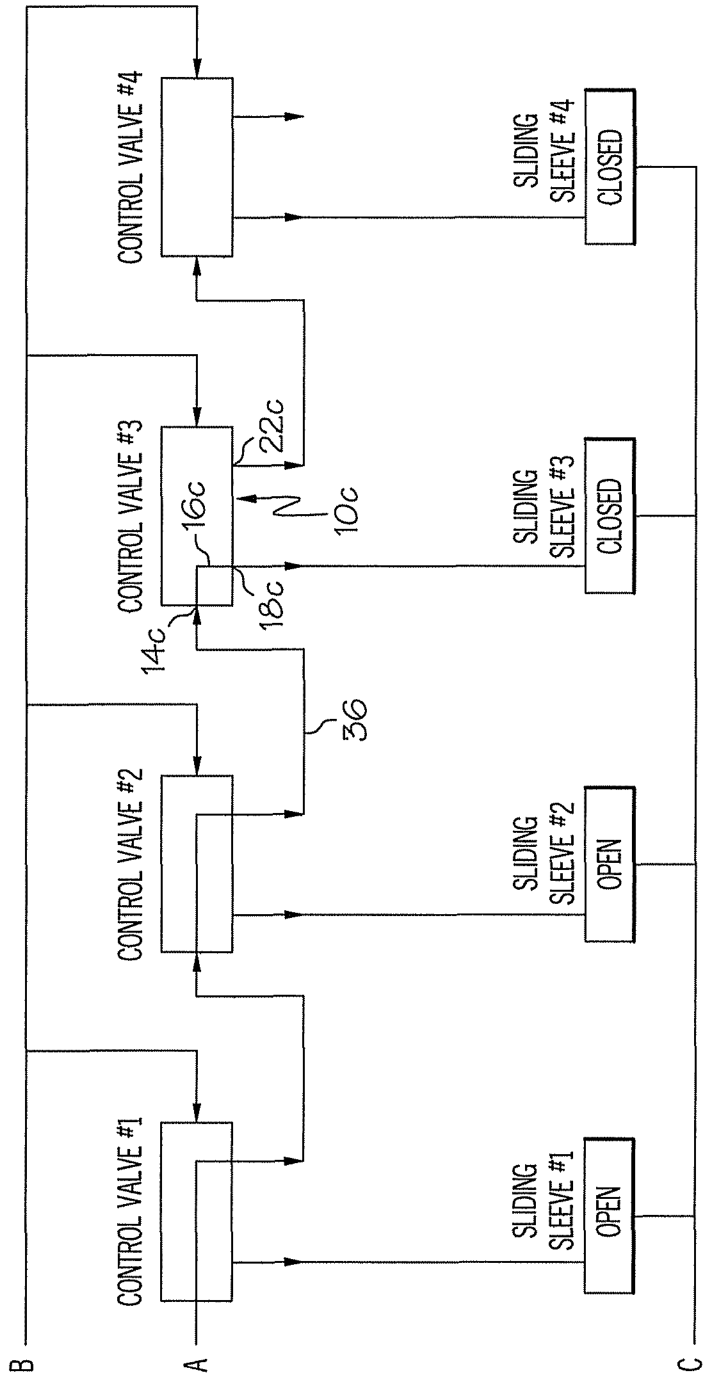
FIG. 4 is the illustration of FIG. 2 in another different position.
Figure 5:
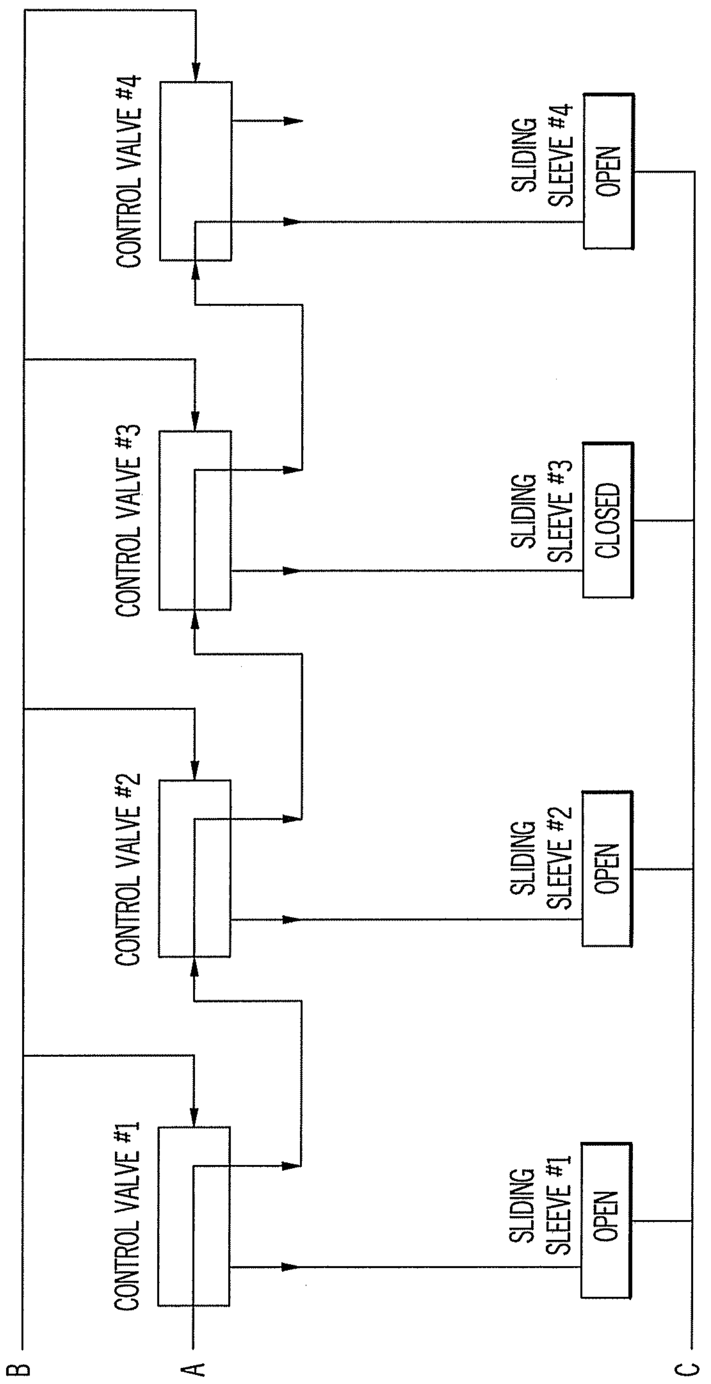
FIG. 5 is the illustration of FIG. 2 in another different position.
Figure 6:
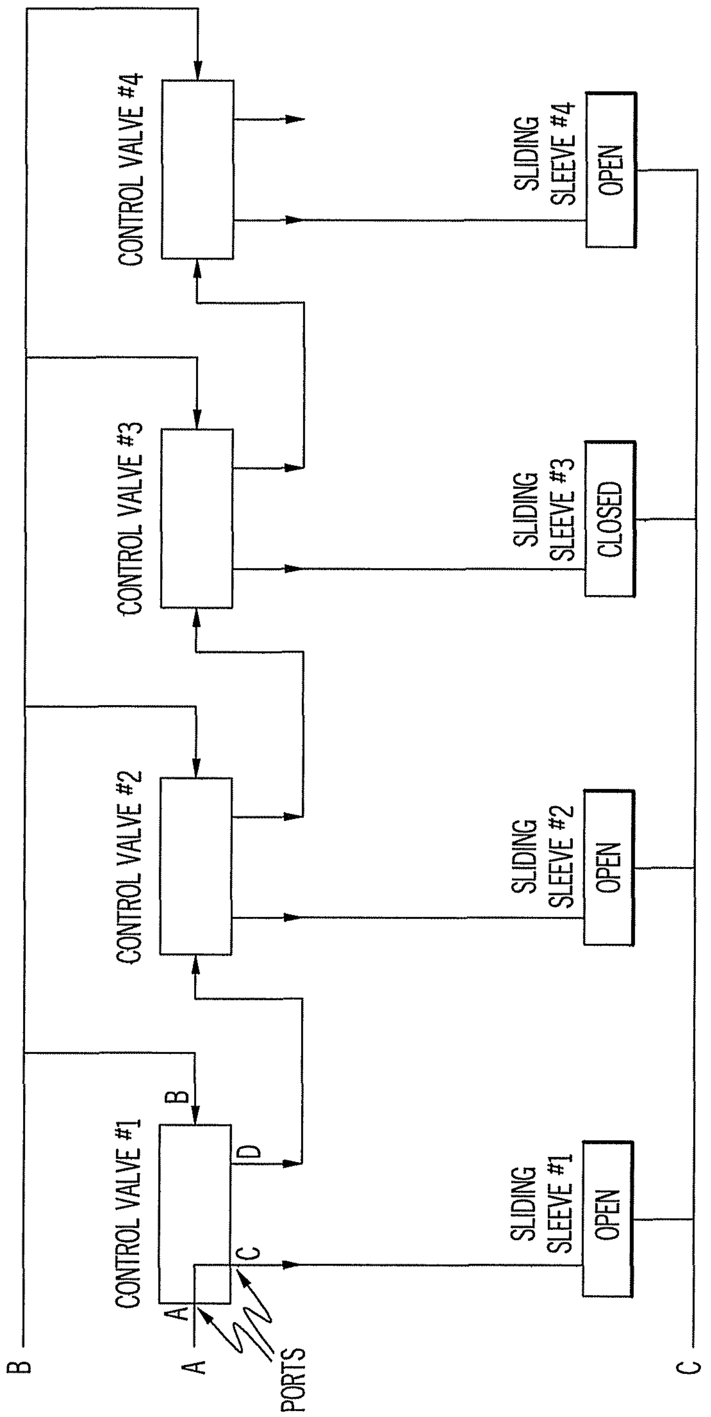
FIG. 6 is the illustration of FIG. 2 in another different position.
Figure 7:
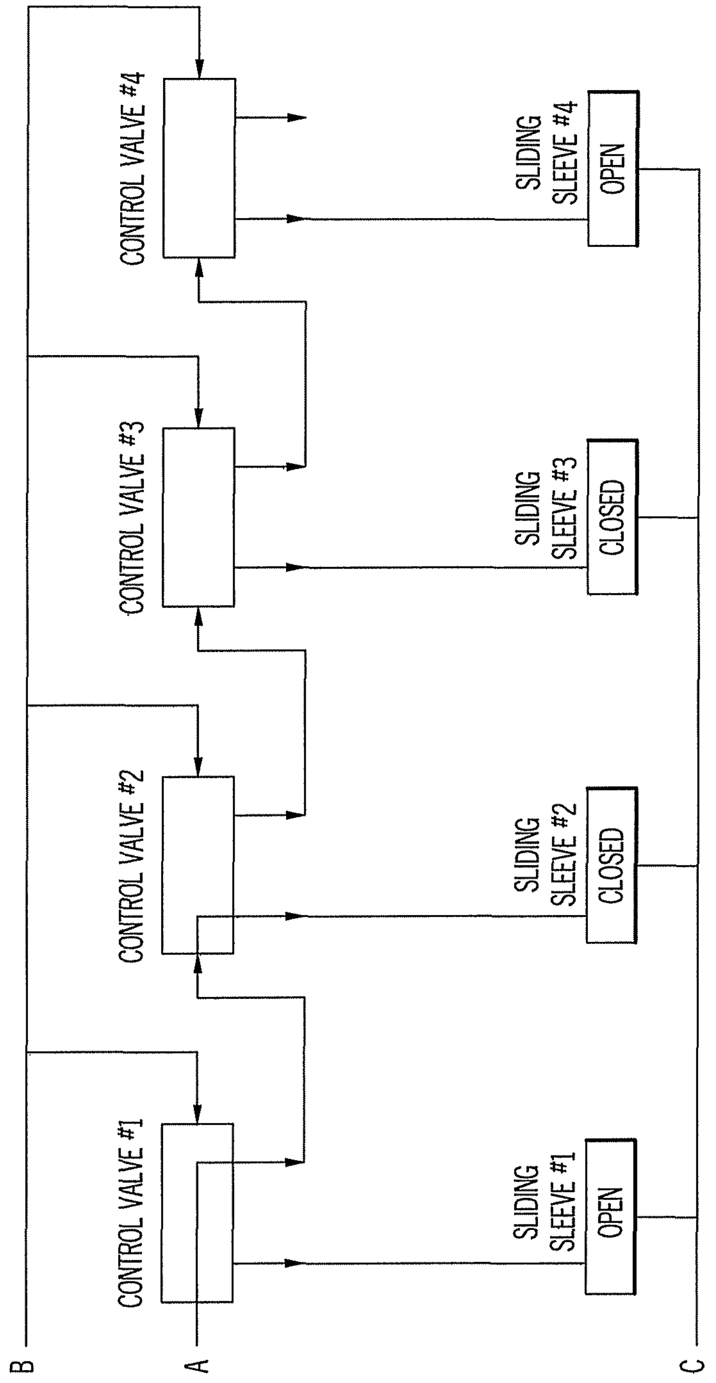
FIG. 7 is the illustration of FIG. 2 in another different position.

Upon a subsequent pressure event for control valve 10*b*, pressure is passed through spool port 20*b* to valve port 22*b* through another flow indicator 66 to inlet port 14*c* of control valve 10*c* which is illustrated as addressed in FIG. 4 (in FIG.

4 the device 120 is illustrated as not actuated and therefore left in the closed position while the spool valve is cycled). The process described is repeated for as many valves as are in the series.

As will be appreciated from the foregoing, any or all of the devices 100, 110, 120 or 130 can be selectively positioned as desired in the open or closed position pursuant to the appropriate number of pressure cycles (1 plus the number of devices preceding the target device) and the conditioning of line C to either permit pressure to exhaust therethrough or to not allow pressure to exhaust therethrough thus allowing actuation of the device or causing the device to remain hydrolocked in place, respectively.

Further to the selective actuation from a first position to a second position of the devices as disclosed above, the control valve(s) and system described herein also facilitate selective actuation of target devices from the second position to the first position.

In order for the target device to move from the second position to the first position, the device must already be in the second position, the line pressure in line C must be greater than that in line A and the control valve associated with the target device must be in a position connecting the inlet port 14 of the control valve with the device port 18 of the control valve. This set of conditions allows pressure from line C to act on the target device while pressure is exhausted from that device through line A. Target devices are in this way addressed one at a time as any device whose control valve is set in the position connecting the inlet port 14 to the valve port 22 is dead headed at device port 18 thereby hydraulically locking that device. In the system as illustrated, all but one of the control valves in the entire system is deadheaded. Thus for any given position of the system, only one device is operable based upon a pressure up on line C. Because of this, selective control of every individual device (or groups of devices if so configured on a particular or each control valve) is achievable with the system hereof. As a worst case scenario on time required to operate a specific device, if the control valve of the target device is currently in the second position, a reset and then a pressure up sequence equal to the number of preceding valves is required to gain the required fluid connection for a pressure-up on line C to actuate the target device from the second to the first position.

The control valve and system described herein advantageously offers selective actuation between first and second positions of a particular one of a plurality of actuatable devices using solely three hydraulic control lines at any given location within a wellbore or the other installation requiring control of multiple devices using a limited number of control lines.

The invention claimed is:

1. An actuation system consisting of:

a first control line;

a plurality of control valves connected to the first control line, each valve being addressable and conditionable to selectively supply hydraulic fluid pressure individually to each of a device and another one of the plurality of control valves;

a plurality of the devices each in operable communication with one of the plurality of control valves;

a second control line in communication with the plurality of devices and operatively arranged for pressurizing the plurality of devices oppositely with respect to the first control line; and a third control line in communication with the plurality of control valves and operatively arranged to reset the plurality of control valves to an initial configuration; wherein each of the plurality of control valves is initially conditioned to supply hydraulic fluid pressure to an associated one of the plurality of devices and after being first addressed is automatically conditioned to supply hydraulic fluid pressure to another one of the plurality of control valves and each of the plurality of control valves once conditioned to communicate with the another one of the plurality of valves remains conditioned to communicate with the another one of the plurality of valves until a reset of each valve so conditioned.

2. An actuation system comprising:

a first control line;

a plurality of control valves connected to the first control line, each valve being addressable and conditionable to selectively supply hydraulic fluid pressure individually to each of a device and another one of the plurality of control valves;

a plurality of the devices each in operable communication with one of the plurality of control valves;

a second control line in communication with the plurality of devices and operatively arranged for pressurizing the plurality of devices oppositely with respect to the first control line;

wherein the hydraulic fluid pressure for actuating the plurality of devices is supplied by the first control line into the actuation system through a first valve of the plurality of valves only.

3. The actuation system of claim 2, wherein the plurality of valves is arranged in a sequential order starting from the first valve, the plurality of valves includes a given valve having a position in the sequential order, the plurality of devices has a given device in operable communication with the given valve, and initially or after reset, the actuation system is pressurized a number of times equal to the position of the given valve in order to communicate hydraulic pressure from the first control line to the given device.

4. The actuation system of claim 2, wherein the plurality of devices includes a given device, the plurality of control valves includes a given valve, the given device being in operable communication with the given valve, and hydraulic fluid pressure from the first control line being communicated to the given device by passing through the first valve and any subsequent valves in the plurality of control valves, until finally passing to the given device through the given valve.

* * * * *